(12) United States Patent
Ziemann-Nothe et al.

(10) Patent No.: US 9,421,494 B2
(45) Date of Patent: Aug. 23, 2016

(54) FLUE GAS PURIFICATION DEVICE

(71) Applicant: DOOSAN LENTJES GMBH, Ratingen (DE)

(72) Inventors: Annette Ziemann-Nothe, Essen (DE); Aat Pelkmann, Kamen (DE)

(73) Assignee: DOOSAN LENTJES GMBH, Ratingen (DE)

( * ) Notice: Subject to any disclaimer, the term of this patent is extended or adjusted under 35 U.S.C. 154(b) by 168 days.

(21) Appl. No.: 14/378,232

(22) PCT Filed: Feb. 21, 2013

(86) PCT No.: PCT/EP2013/053441
§ 371 (c)(1),
(2) Date: Aug. 12, 2014

(87) PCT Pub. No.: WO2013/143788
PCT Pub. Date: Oct. 3, 2013

(65) Prior Publication Data
US 2015/0035177 A1 Feb. 5, 2015

(30) Foreign Application Priority Data
Mar. 29, 2012 (EP) .................................... 12162282

(51) Int. Cl.
*B01F 3/04* (2006.01)
*B01D 47/06* (2006.01)
*B01D 53/18* (2006.01)
*B01D 53/14* (2006.01)

(52) U.S. Cl.
CPC ................ *B01D 53/18* (2013.01); *B01D 47/06* (2013.01); *B01D 53/1493* (2013.01); *B01F 3/04007* (2013.01); *B01F 3/04106* (2013.01); *B01D 53/1425* (2013.01); *B01D 2251/102* (2013.01); *B01D 2252/1035* (2013.01); *B01D 2257/302* (2013.01); *B01D 2257/504* (2013.01); *B01D 2258/0283* (2013.01)

(58) Field of Classification Search
CPC .... B01F 3/04; B01F 3/04007; B01F 3/04099; B01F 3/04106; B01D 47/00; B01D 47/06
USPC ............... 96/243, 322; 261/117, 119.1, 121.1
See application file for complete search history.

(56) References Cited

U.S. PATENT DOCUMENTS 5,690,899 A    11/1997  Makkinejad et al.

FOREIGN PATENT DOCUMENTS

| EP | 0162536 | B1 | 1/1996 | |
|----|---------|----|---------|--|
| EP | 0756890 | B1 | 5/2000 | |
| JP | H11290646 | A | 10/1999 | |
| WO | WO 9951328 | A1 * | 10/1999 | ............. B01D 53/07 |
| WO | 2009014016 | A1 | 1/2009 | |
| WO | 2010131327 | A1 | 11/2010 | |

OTHER PUBLICATIONS

International Search Report for App. No. PCT/EP2013/053441 filed Feb. 21, 2013.

* cited by examiner

*Primary Examiner* — Robert A Hopkins
(74) *Attorney, Agent, or Firm* — Walker & Jocke

(57) ABSTRACT

The invention relates to a flue gas purification device with a scrubber tower (10), also called a scrubbing tower, a washing tower or an absorption tower.

10 Claims, 2 Drawing Sheets

FLUE GAS PURIFICATION DEVICE

Figure 1:
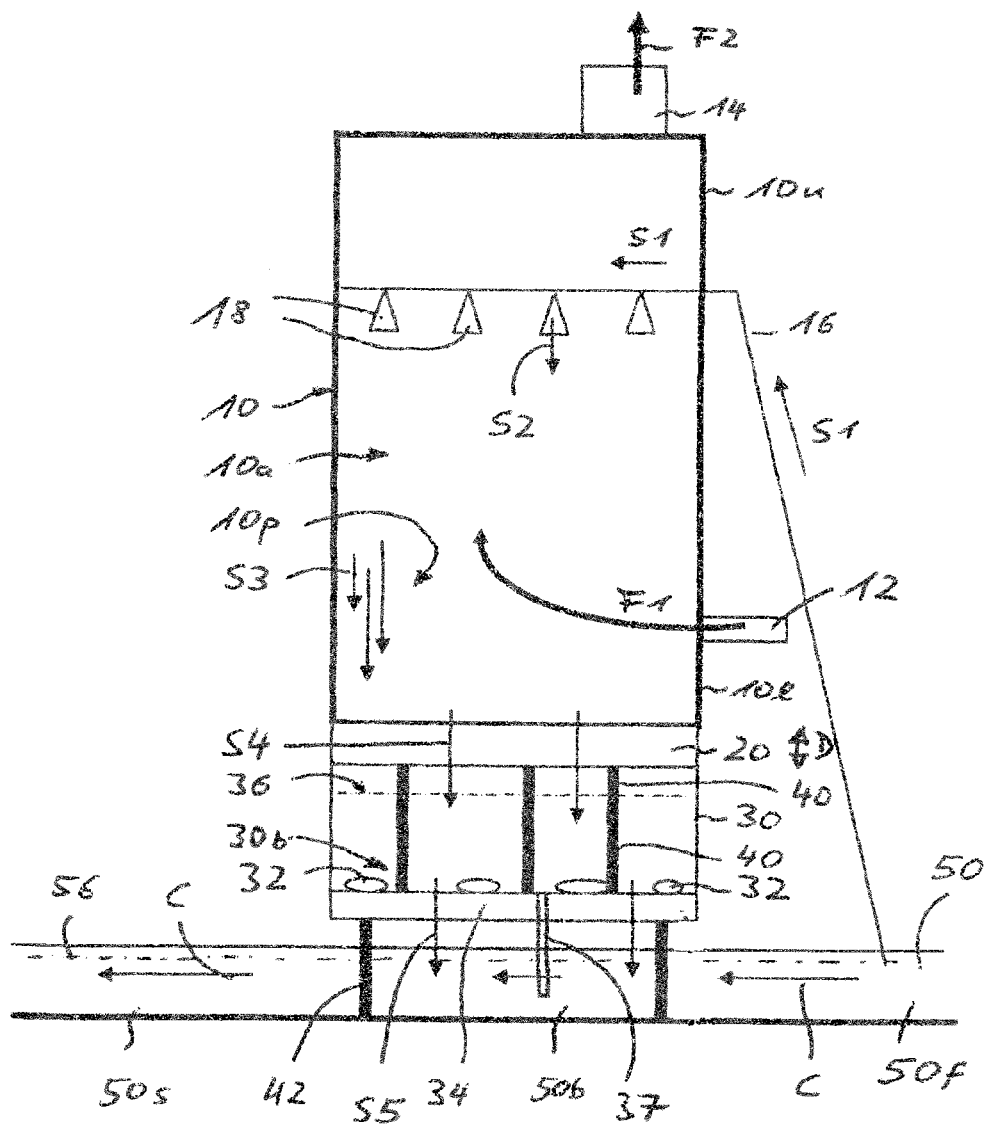

The invention relates to a flue gas purification device with a scrubber tower, also called a scrubbing tower, a washing tower or an absorption tower.

The invention particularly relates to a gas purification device and a corresponding scrubber tower operating with seawater as a liquid to absorb undesired components from the flue gas. That is why said liquid (fluid) is also called an absorbent.

Flue gas, which may derive from a power station, is often introduced at the lower part of the scrubbing tower into the scrubbing tower—via a corresponding entrance—and further guided upwardly to a flue gas exit. Along this way through the scrubber tower the flue gas is brought in contact with the said fluid absorbent, often in a counter flow. Correspondingly the absorbent is introduced into the scrubber tower above the flue gas inlet, e.g. at the upper end of the scrubber tower, thus defining the section between the flue gas entrance and the absorbent inlet as the absorbing zone, which represents a contact zone for said liquid and said flue gas.

It is further known to arrange nozzles at the upper end of the absorbing zone, by which the fluid absorbent is sprayed as fine particles (droplets) into the absorbing zone to provide a preferably large reaction surface with the flue gas to be purified.

The absorbent, also called scrubbing fluid, for example seawater, may absorb and/or chemically react with various components/impurities of the flues gas, such as sulphur oxides and $CO_2$.

In the following the term "fresh liquid" is used for the fluid absorbent introduced into the scrubber tower (with a pH value of about 7.5 to 8.5) while the term "used liquid" characterizes the fluid after its contact with the flue gas (with a pH down to about 3 to 4). As far as reference is made in the following to seawater as such liquid it should be understood that this is only one embodiment of a suitable liquid, although a preferred one.

A device and scrubbing tower as described above is known from EP 0756 890 B1.

It is further known from EP 0756 890B1 to arrange a so called sump at the lower part or below the scrubbing tower. The used liquid (seawater) is collected in the sump and aerated during its dwell time within the sump, then transferred to a further (after) settling tank for post treatment before being redirected into the sea.

Although devices of the generic type mentioned have been proved over the past years there is a continuous demand to improve the process, including the purification degree of the flue gas and the quality of the absorbent before being returned to the sea.

The invention starts from the following cognition:

Typically the nozzles, by which the liquid is sprayed into the scrubbing tower, are arranged all over the inner cross section of said scrubbing tower. The flue gas is blown into the same space, so that the more or less complete inner volume of the scrubbing tower may be used as an absorbing zone. This embodiment will be described further hereinafter, although within the meaning of the invention the term nozzles represent any kinds of means by which the liquid may be distributed in the washing tower.

Further: the invention is not restricted to absorbers where the liquid is sprayed (as described hereinafter) but also for absorbers which bring the fluid absorbent in contact with the flue gas by other methods such as so called packed beds.

In most cases the entrance of the flue gas is arranged at one side of the scrubbing tower thus causing a strong horizontal air flow component before the flue gas is directed upwardly.

Correspondingly the fluid absorbent, running downwardly, is at least partly pushed away by said strong flue gas flow, mostly at the lower end of the scrubbing tower.

In other words: While in the upper part of the absorption section the liquid is more or less homogenously distributed all over the inner cross section and volume of the scrubbing tower the flue gas may displace the fluid stream especially around the flue gas (raw gas) entrance and further downwardly. This is true in an analogous manner if the flue gas entrance is designed differently, for example circumferentially with respect to the scrubbing tower.

As a consequence of this flow behaviour the concentration of used liquid entering the sump in prior art devices is different at different areas of the sump and in particular arbitrary. In other words: The composition of the used absorbent within the sump is different at different areas of the sump and by no means definable. Correspondingly the efficiency of the treatment means, for example the aeration means, is arbitrary and insofar not always satisfying. This is true as well after the liquid has been aerated in the sump as liquid from different areas within the sump has been treated differently before leaving the sump, meaning that post treatment means for the liquid are of considerable importance with respect to liquid (seawater) quality before the liquid is given back into the sea. Complex technical equipments and additional costs for such further treatment steps are a disadvantage.

This is true as well with a device, including a channel running through said sump, by which channel fresh seawater is introduced and mixed with the used absorbent fluid in the sump.

To overcome this drawback the invention claims a flue gas purification device with a scrubber tower, which scrubber tower comprises:
- a flue gas entrance and a flue gas exit
- a liquid entrance and a liquid exit,
- a contact area for said flue gas and said liquid between said flue gas entrance and said liquid entrance,
- a collecting basin for said liquid below said contact area, wherein
- the collecting basin is equipped with aeration means and a bottom or side wall permeable to said liquid.

While the collecting basin is placed within the device similarly to the liquid sump according to prior art devices it may now fulfil a number of different tasks, hereby improving the aeration step.

The known sump is either
- a discrete sump from which the aerated liquid is pumped to further treatment steps via pipes or similar installations, extending from a wall section of the sump, or
- part of the "running channel" with fresh seawater passing through the sump.

The new device provides a collecting tank with aeration means, wherein the collecting tank has a bottom permeable to said liquid treated in said tank. In other words: The bottom (partly or completely) of the collecting tank is used as an outflow area for said fluid. This allows to achieve a more or less uniform vertical flow direction of the liquid in the tank and insofar a very uniform aeration treatment over the horizontal cross section of said tank, improving the homogeneity and quality of the liquid compared with the first alternative of the known sump, by which arbitrary currents may be produced.

The second alternative of the prior art sump has the disadvantage of an irregular dispersion of fresh liquid added and used liquid already present in the sump all over the sump volume and a continuous flow in the sump. The new design provides at least one wall section of the collecting tank being permeable to liquid and thus reduces the flow speed and avoids undesired currents of said liquid.

These effects are particularly achieved with a bottom or side wall being designed according to at least one of the following structures: perforated plate, three-dimensional profile with flow-through openings, sphere packing or the like. The effects described may by maximized the larger the area permeable to said liquid is. Most suitable embodiments provide the complete bottom as permeable to the liquid or correspondingly the complete wall section of the tank through which the construction allows the liquid flowing.

The invention clearly distinguishes the barrier (wall, bottom) permeable to the liquid as an outflow area from known devices characterized by one opening, pipe, channel or the like. In other words: The invention provides a much larger outflow area (bottom, wall) with a huge number of outlet openings with a cross section of each opening being much smaller compared with the mostly one relatively large outlet opening of a prior art sump.

Typically the flow through openings according to the invention each have a cross-section of less than $1\ m^2$, particularly $<0.7$ or $<0.5$ or $<0.3$ or even $<0.1\ m^2$ which is about 10-1000 times less compared with the outlet opening of a prior art sump (being in the range of several $m^2$). The outflow openings of a device according to the invention may be covered by caps, arranged at a distance above the respective openings so as to leave a space for the used seawater to pass between cap and opening.

The scrubbing tower of the device may further comprise at least one distributor, through which or adjacent (beside) which the liquid may flow downwardly, arranged at a distance below the said liquid entrance and extending over at least 50% of a corresponding inner horizontal cross-section of said scrubber tower.

An important feature is the design and arrangement of the at least one distributor below the entrance area of the liquid. For example the liquid may be sprayed into the contact area of the washing tower by a number of nozzles, arranged side by side across a horizontal plane within the washing tower.

The distance between the liquid entrance and the distributor(s) may be selected in accordance with the specific dimensioning of the device.

The distributor has the task to divert (deflect) the liquid stream (mostly present as droplets or as an aerosol) on its way toward the liquid exit, i.e. toward the lower end of the washing tower and/or subsequent treatments means. In this respect a device with a distributor being arranged in the lower part of the scrubbing tower, for example below a flue gas entrance at the lower part of the scrubber tower is preferred.

The distributor should be placed above said collecting tank (collecting area).

The term "lower end of the washing tower" includes embodiments where the collecting area is not an integral part of the washing tower but arranged as a separate component below the washing tower.

The distributor may be an installation, which is (A) at least predominantly impermeable to the liquid and/ or (B) at least predominantly permeable to the liquid.

"Predominantly impermeable" means that >50%, for example >75% or >90% the total liquid volume will flow through a boundary area of the distributor or between an outer rim of the distributor and the corresponding inner wall of the scrubbing tower. "Predominantly permeable" means that >50%, for example >75% or >90% of the total liquid volume will penetrate all over the distributor.

According to (A) the liquid is running along the surface of the distributor to its rim (outer periphery), being arranged at a distance to the corresponding inner wall of the washing tower, thus providing a corresponding flow through opening for the liquid and then further via said opening into the collecting area. The same technical effect may be achieved by a distributor with one or more larger through holes which are arranged eccentrically, i.e. within a limited boundary section of the distributor. Both embodiments allow to direct the used absorbent liquid toward one or a few large openings, which are arranged in proximity to the inner wall of the washing tower and through which the liquid may flow as a (one) more or less common stream into subsequent sections of the device or treatment steps respectively.

Starting from this eccentrically arranged flow through openings(s) of the distributor the common stream of used liquid may be treated homogeneously on its way back into the sea. This will be further explained by means of a collecting basin being equipped with aeration means thus taking the function of an aeration basin (aeration tank). As all the used liquid may take the same way through the aeration basin the used liquid is aerated/treated in a very uniform manner. The aeration step is improved and so is the quality of the liquid. These advantages may be achieved in particular in an embodiment of the aeration basin, where the liquid stream is more or less horizontal.

According to (B) the distributor is permeable to liquid, for example its is equipped with a large number of flow through holes distributed all over its body. The used seawater is spread all over the upper surface of the distributor before passing the holes and penetrating into the following aeration basin. When the holes are arranged in a more or less uniform way all over the distributor the used seawater is entering the aeration basin (or other treatment means) in a very uniform manner over the cross section of the scrubber tower. Accordingly the liquid is treated uniformly in the said aeration basin, especially in an embodiment where the basin is designed such that the liquid leaves the basin downwardly, for example via a permeable bottom, i.e. the liquid stream is more or less vertical.

In any case the purpose is to achieve an improved and uniform treatment of the used seawater in any treatments steps below or after the at least one distributor.

The distributor helps to provide used liquid of more or less uniform composition at any place upon, along and/or beneath said distributor area to release gas bubbles, present in the absorbent, before entering that part of the device where aeration take place to slow down the speed of the liquid flow and thus to avoid any undesired currents (flow profiles) of said liquid to achieve a mostly uniform reaction of the used absorbent with the air. $CO_2$ is stripped out of the seawater (fluid absorbent) more effectively to remove carbonic acid and raise the pH value of the liquid to homogenize the composition and quality of the aerated absorbent (thus reducing the necessity or intensity of additional treatment means)

to improve the general quality of the seawater which will later be released into the sea.

Several distributors may be arranged side by side and/or above each other.

The permeability to the liquid is the decisive factor to design a distributor according to (B). One option is to use a perforated plate, wherein the term "perforated" characterizes holes, slits etc for the liquid (seawater) to flow through. The plate may either be planar or profiled. The profiled embodiment leads to a three-dimensional profile with flow-through openings.

Another possibility is to design the distributor according to a sphere packing. This design increases the distribution (spreading) of the liquid in all three dimensions of the coordinate system.

As explained above the liquid absorbent flowing downwardly within the scrubbing tower may be pushed away (displaced) by said strong flue gas flow. In this case the liquid will at first contact only a very limited part (area) of the distributor. Although the subsequent liquid stream will cause the liquid to spread over other parts of the distributor it may support the distribution of the liquid along the distributor when the latter is inclined and/or moveable, including embodiments with vibrating distributors.

According to the invention the distributor should extent over at least 50% of the inner cross section of the scrubbing tower to achieve the advantages mentioned at its best (although any distributor will improve the process). According to embodiment (B) it will typically extent over >60%, >75%, >90% or completely across the scrubbing tower, while according to embodiment (A) the maximum will be around 90% with typical values <85%, <80%, <75% to allow the necessary volume of liquid to pass by.

In this context the following dimensions of a typical device should be noted:
  height of the scrubbing tower: 15-40 m
  inner diameter of the scrubbing tower: 5-25 m
  flue gas flowing through the scrubbing tower: 10.000-4.000.000 $m^3/h$
  liquid (absorbent) flowing through the scrubbing tower: 5.000-80.000 $m^3/h$ All embodiments provide the possibility for any gas bubbles within the liquid to escape before the liquid enters the aeration zone and/or further treatment steps. The distributor discerps the liquid or liquid droplets respectively thus freeing any undesired gaseous inclusions. This as well is an important aspect of the distributor.

Another important advantage which may be achieved by the installation of said distributor (divider, spreading means) into the liquid flow is that the speed of the liquid stream is reduced, i.e. the distributor serves as a retarder.

The liquid may enter the section below the distributor with a much more defined and constant speed, compared with prior art.

The liquid, after having passed the at least one distributor, flows into said collecting tank which is equipped with aeration means to feed air (oxygen) into the liquid.

The specific design, including the individual and total cross sections as well as the number of outlet openings within said permeable bottom or wall will be calculated according to the amount of liquid passing the basin when the device is in operation.

The corresponding parameters may be selected in such a way that the liquid level (free upper surface of the liquid in the basin) being arranged beneath the distributor, although situations where the water level reaches the distributor or the distributor becomes immersed by the liquid do not influence the efficiency of the device characteristicly.

According to the invention the aeration means may be arranged in a part of the basin close to its bottom or in its bottom. They may be immersed in the liquid flowing through said basin.

The construction and design of the aeration means is not decisive. Perforated pipes, air nozzles, plate aerators etc. may be used.

It becomes clear from the foregoing that the arrangement and function of the aeration basin within the inventive device replaces the so-called sump of known devices.

After this aeration treatment the liquid may be forwarded to further treatments or back to the sea, in case of seawater being used as liquid.

In this context the invention provides an embodiment according to which the collecting basin (collecting area) is arranged in fluidic connection with a channel transporting a fluid from a first section adjacent to a first side of the basin to a second section adjacent to a second side opposite to said first side. This fluid may be the fresh liquid as used for absorption purposes within the scrubbing tower.

As known from prior art devices the absorbent liquid may be taken from the channel fluid and pumped upwardly to the nozzles mentioned, while the remaining channel fluid passes the scrubbing tower before the used and treated (purified) absorbent liquid is redirected into the channel.

According to another embodiment of the invention the said basin (in general: collecting area) is arranged above the channel, allowing the aerated liquid to be returned into the channel just by gravity and/or under pressure/suction caused by the fluid flowing through said channel. In this case the distributor is preferably designed according to B.

This design includes an embodiment where the channel has a deepened bottom extension below said basin compared with its first and second sections. In other words: The bottom of the channel is sloping beneath the basin in a meander-like fashion.

These new designs are characterized by a kind a of a by-pass channel, from which fresh liquid may be taken and pumped towards and into the scrubbing tower, which later being returned in the channel but which does not cross the aeration zone of the device.

Prior art devices disclose a design with a so called "running channel", characterized by a channel running through the sump. This design has the advantage of a simple construction but the disadvantage that fresh liquid (seawater) is added to the used liquid in the sump so that a much larger volume of said (mixed) liquid must be treated by said aeration means which causes further energy demand and costs and reduces the efficiency of the aeration step. These disadvantages may be reduced or overcome by the invention, independently of the specific design and arrangement of the distributor. This technology is of particular advantage in combination with a distributor of type A and being arranged in such a way that the used seawater is redirected by said distributor towards the entrance area of said channel into the liquid collecting area at the lower end of the scrubbing tower or beneath said tower. In this case the collecting basin/collecting tank may be provided with corresponding wall sections permeable to the liquid or with exit doors in said wall sections, so that the liquid may flow through the basin in a more or less horizontal flow direction. In other words: The collecting area becomes part of the channel.

The used liquid (absorber seawater) still contains sulphur compounds and a high amount of $CO_2$. The latter may be stripped out by blowing in air to remove the carbonic acid and thereby raises the pH value of the liquid. The oxygen will be absorbed by the liquid and contribute to the oxidation process of the sulphur compounds (up to $SO_4$).

The aeration process is improved by the distributor as it already reduces the $CO_2$ concentration in the liquid before entering the aeration step. Correspondingly the energy for activating the aeration means may be reduced, meaning that less air being necessary to achieve the same quality of purification of the treated liquid (seawater).

The addition of fresh seawater further increases the overall pH value of the liquid.

The general idea of one or more distributors arranged in a scrubber tower beneath the liquid entrance and often beneath the flue gas entrance may be realized as well with other designs of devices.

The device may be completed by further post-treatment means for the liquid, for example a further aeration zone at a distance to the one mentioned. In view of the excellent seawater treatment in the scrubbing tower and/or below the scrubbing tower according to the invention there will be less need for further post treatments means.

Further features of the invention are described in the subclaims and the other application documents. The invention includes combinations of those features if appropriate and not specifically excluded.

The invention will now be described by way of two examples. The attached drawing illustrates, in a schematic way, in FIG. 1: a longitudinal cross section through a first embodiment of a device according to the invention FIG. 2: a longitudinal cross section through a second embodiment of a device according to the invention Throughout the drawing same construction elements or construction elements with similar function are characterized by the same numeral.

FIG. 1 shows a part of a flue gas purification with a cylindrical scrubber tower 10. It comprises: a flue gas entrance 12 at its lower part (end) 10l and a flue gas exit 14 above said flue gas entrance 12, namely at its upper part 10u. The entering flue gas stream is symbolized by arrow F1, while the leaving flue gas stream is characterized by arrow F2.

From a channel 50, which will be described in more detail hereinafter, fresh seawater is pumped via a feeding pipe 16 to spray nozzles 18 arranged along a horizontal cross section at the upper part 10u of the scrubbing tower 10, below flue gas exit 14.

Fresh seawater is sprayed downwardly via said nozzles 18 into the flue gas stream, which passes the scrubbing tower 10 upwardly, i.e. in a counterflow to said seawater droplets, which seawater serves as an absorbent to purify the flue gas. The transport direction towards said nozzles 18 is shown by arrows S1, the flow direction of the seawater absorbent, leaving said nozzles 18, is symbolized by arrow S2.

The strong flue gas flow entering the scrubbing tower 10 is responsible for the seawater absorbent being pushed—at least partly—towards a part of the scrubber tower 10 opposite to said flue gas entrance 12. In other words: The seawater droplets being released by said nozzles 18 all over the cross section of the scrubber tower 10 are directed on their way downwardly towards an area opposite flue gas entrance 14, symbolized in FIG. 1 by numeral 10p, while the corresponding flow of seawater is characterized by arrows S3.

Seawater in the lower part 10l of the scrubbing tower 10 has passed the absorption area, symbolized by numeral 10a and therefore is called used seawater. It exits the scrubbing tower at its lower end, i.e. the liquid exit is at a distance below its entrance.

Below flue gas entrance 12 the scrubber tower 10 is equipped with a distributor 20. The distributor 20 extends over the complete inner horizontal cross-section of said scrubber tower 10 so that the seawater absorbent (used seawater), when reaching the distributor 20, is stopped by said distributor and distributed along its surface before continuing its downwardly oriented flow and flowing through openings (not illustrated but symbolized by arrows S4) of said distributor 20 into a discrete basin 30 arranged below distributor 20.

This discrete basin 30 could also be arranged within the lower part 10l scrubbing tower 10, i.e. part of it.

The distributor 20 is responsible for a more or less uniform distribution of the used seawater absorbent independently of its orientation on its way downwardly. It is arranged in a moveable way (arrows D) and is supported on vibrating bearings.

The basin 30 collects the used seawater temporarily and aerates said used seawater by aerators 32, arranged at a short distance each other all over bottom area 30b.

The aeration means 32 are immerged in the liquid flowing vertically downwardly through said basin 30.

After this air treatment the seawater leaves the basin 30 via its permeable bottom 34 (again with a vertical flow direction, symbolized by arrows S5) and enters channel 50. This bottom 34 is designed correspondingly to the distributor 20 but may have any other design. It is important that the seawater may escape the basin 30 in the desired amount and in a uniform manner by corresponding openings and/or pipes (one of numerous pipes is shown by numeral 37). These pipes 36 protrude into the liquid stream within channel 50.

The surface of the used and treated (aerated) seawater in said basin 30 is symbolized by dotted line 36.

The surface of the aerated seawater, now flowing horizontally within the channel 50 (having no upper cover), is symbolized by dotted line 56.

Channel 50 leads to post treatment arrangements for said seawater (being optional and therefore not illustrated further) before being directed back to the sea.

There is a continuous flow of fresh seawater along said channel 50 from a first section 50f before through a middle section 50b below to a second section 50s behind said scrubbing tower 10 and basin 30 respectively. In the middle section 50c the aerated treated seawater is added. The horizontal seawater flow along channel 50 is illustrated by arrows C.

This design provides the advantage that the aeration of used seawater is performed homogeneously within said basin 30 and insofar with much reduced energy and much increased efficiency compared with prior art devices, according to which the fresh seawater stream is mixed with the used seawater before or during aeration. According to the new design the absorbent liquid is mixed with fresh seawater only after the aeration treatment.

Discrete columns 40 extend between bottom 34 and distributor 20 to support the construction. The complete construction (scrubbing tower 10 with its basin 30) is built on discrete foundations 42.

Figure 2:
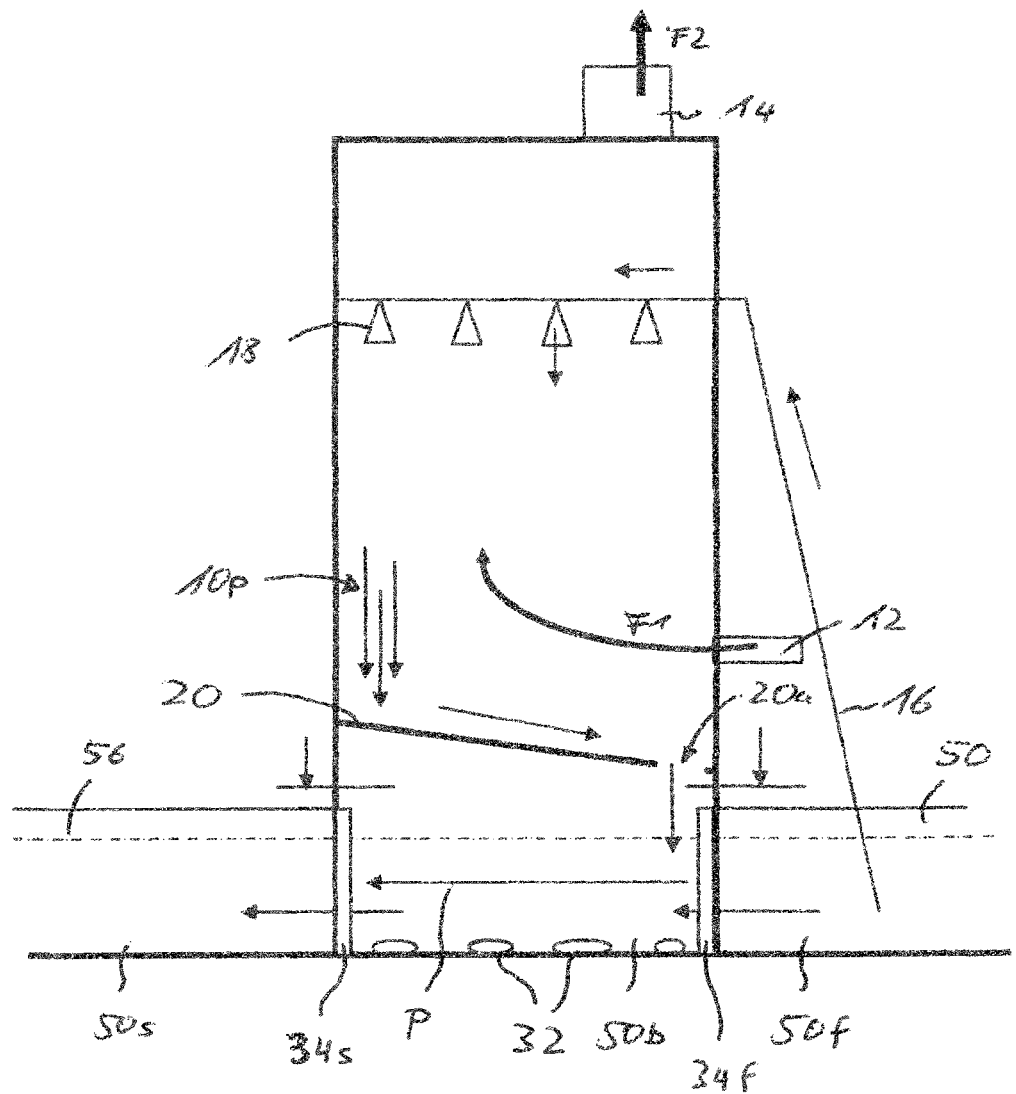
Figure 2:
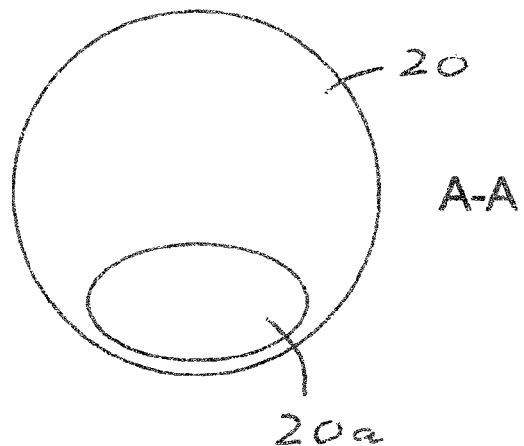

FIG. 2 shows an embodiment of the gas purification device including a distributor 20 of the type mentioned as A above.

All parts of the device arranged above the distributor 20 are in accordance with the embodiment of FIG. 1 to which reference is made insofar.

The distributor 20 of FIG. 2 is made of a solid metal plate of circular shape with an oval part 20a cut away, as shown in the top view (A-A). The total surface area of distributor 20 corresponds to about 80% of the corresponding cross section of scrubbing tower 10 in this area.

While the distributor 20 is fastened along its outer rim at the inner wall of scrubbing tower 10 the oval cut 20a provides a flow through opening opposite (in FIG. 2 right) to the main stream (area 10p) of the liquid, thus causing the used liquid to spread along the inclined surface of distributor 20 before the complete volume of used liquid passes said opening 20a and flows into collecting tank 30.

In an alternative the opening 20a may be designed as one open end of a pipe, extending toward the basin 30 and ending above liquid level 56 or even penetrating into the liquid bath within basin 30 for a very precise feeding of liquid into said basin 30.

In other words: The complete liquid stream is caused by said distributor to enter the colleting tank 30 in proximity to the first section 50*f* of channel 50.

This is decisive insofar as this allows to provide a constant/defined mixture of used and fresh liquid to pass the whole collecting tank 30 along the middle section 50*b* of said channel 50 (beneath scrubbing tower 10) before continuing into the second section 50*s* of said channel (illustrated left in FIG. 2). This allows as well to treat this mixture of fresh and used liquid in a very defined manner within said collecting tank 30 by introduction of air via said aeration means 32. This is symbolized in FIG. 2 by arrow P, extending over the complete horizontal diameter (length) of collecting tank 30.

To allow the fresh seawater in channel 50 to enter the collecting area 30 the scrubbing tower 10 is equipped with a corresponding first lower wall section 34*f* which is permeable to said liquid. The same type of permeable wall is installed opposite to the first wall section 34*a* as a second wall section 34*s* permeable to said liquid.

The aerators 32 are arranged on the bottom of tank 30, which in this embodiment corresponds to the bottom of channel section 50*b*.

The invention claimed is:

1. A flue gas purification device with a scrubber tower (10), which scrubber tower (10) comprises:
   1.1 a flue gas entrance (12) and flue gas exit (14),
   1.2 a liquid entrance (18) and a liquid exit,
   1.3 a contact area (10*a*) for said flue gas and said liquid between said flue gas entrance and said liquid entrance (18),
   1.4 a collecting basin (30) for said liquid below said contact area (10*a*), which collecting basin (30) being equipped with
      1.4.1 aeration means (32) and
      1.4.2 a bottom (34) or side wall (34*f*, 34*s*), permeable to said liquid,
   wherein the collecting basin (30) is arranged in fluidic connection with a channel (50) transporting liquid from a first section (50*f*) adjacent to a first side of the basin (30) to a second section (50*s*) adjacent to a second side of said basin (30) opposite to said first side of said basin (30), wherein the collecting basin (30) is part of the channel (50).

2. The flue gas purification device according to claim 1, wherein at least one of the bottom (34) or side-walls (34*f*, 34*s*) is designed according to at least one the following designs: perforated plate, three-dimensional profile with flow-through openings, sphere packing, valve.

3. The flue gas purification device according to claim 1, further comprising at least one distributor (20), arranged above said collecting basin (30) and through which or adjacent to which the liquid may flow downwardly into the collecting basin (30).

4. The flue gas purification device according to claim 3, wherein the distributor (20) extends over at least 50% of a corresponding inner horizontal cross-section of said scrubber tower (10).

5. The flue gas purification device according to claim 3, wherein the distributor (20) is designed to at least one of the following designs: perforated plate, three-dimensional profile with flow-through openings (26), sphere packing.

6. The flue gas purification device according to claim 3, wherein the distributor (20) has one or more through holes in its boundary area or ends at a distance to an inner wall of the scrubbing tower (10) thus forming one or more flow-through openings (20*a*) for said liquid.

7. The flue gas purification device according to claim 3, wherein the distributor (20) is arranged below the flue gas entrance (12).

8. The flue gas purification device according to claim 1, wherein the collecting basin (30) is arranged above the channel (50).

9. The flue gas purification device according to claim 1, wherein the channel (50) has a deepened bottom extension below said collecting area compared with its first and second sections (50*f*, 50*s*).

10. The flue gas purification device according to claim 1, wherein the liquid is seawater.

\* \* \* \* \*